2,993,928
PREPARATION OF TRIIODOTHYRONINE

Raj Kumar Razdan, Greenford, and Lewis Aubrey Wetherill, Harrow, England, assignors to Glaxo Laboratories Limited, Greenford, England
No Drawing. Filed Jan. 14, 1958, Ser. No. 708,749
Claims priority, application Great Britain Jan. 15, 1957
4 Claims. (Cl. 260—519)

This invention is concerned with improvements in or relating to the production of triiodothyronine, which term is used herein to include both the L- and D-isomers thereof as well as mixtures of these isomers unless otherwise stated.

It is known to prepare triiodothyronine by the selective iodination of diiodothyronine using 1 mol of iodine, in the presence of ammonia or an organic base. In general, however, although 1 mol of iodine is used the crude product is contaminated with unchanged diiodothyronine and also with thyroxine, that is tetraiodothyronine.

It has been proposed (see Gross and Pitt Rivers J. Biochem, 1953, 53, 645) to purify the crude product by suspending it in a large volume of hot aqueous hydrochloric acid (in which triiodothyronine is only sparingly soluble) and after removing the thyroxine present by filtering off its hydrochloride, which is insoluble, cooling the filtrate and allowing the triiodothyronine hydrochloride to crystallize out. The triiodothyronine hydrochloride can be filtered off, the more soluble diiodothyronine hydrochloride remaining in solution in the filtrate. This process of purification is not very efficient, requires at least two treatment steps and the use of large volumes of hydrochloric acid. Furthermore in order to effect substantially complete recovery of the triiodothyronine in the purification it is necessary to extract the insoluble thyroxine hydrochloride with a further quantity of hot hydrochloric acid as some of the triiodothyronine hydrochloride precipitates with the thyroxine hydrochloride when this is filtered off.

We have now found an improved method of freeing triiodothyronine from contaminating diiodothyronine and/or thyroxine which is based upon our discovery that triiodothyronine forms with ammonia or certain suitable organic bases and alkali metal ions a well-defined salt or salt-like substance which is capable of ready recrystallization, and can readily be separated from the contaminating diiodothyronine and/or thyroxine by difference in solubility, particularly in water.

The organic bases which form the said salt or salt-like complex with triiodothyronine and alkali metal ions and which are for convenience hereinafter referred to as "suitable organic bases" are primary and secondary amines having a $pK_b$ greater than 7.2; particularly suitable bases are primary and secondary amines containing from 1 to 8 carbon atoms, for example methylamine, ethylamine, dimethylamine, diethylamine, isopropylamine and butylamine.

According to the invention therefore we provide a process for the purification of crude triiodothyronine from contaminating diiodothyronine and/or thyroxine which comprises forming a salt or salt-like complex between firstly the triiodothyronine, secondly ammonia or a suitable organic base as herein defined and thirdly alkali metal ions and separating said salt or salt-like complex from the contaminating diiodothyronine and/or thyroxine by difference in solubility, preferably in water.

The process according to this invention is particularly applicable to the purification of crude triiodo-L-thyronine.

The process according to the invention is preferably carried out by forming an aqueous solution, if necessary with heating, of the crude triiodothyronine in water containing the ammonia or suitable organic base, preferably in substantial excess, and alkali metal ions, and cooling the solution whereupon the desired salt or salt-like complex crystallises out. The preferred alkali metal ions are sodium or potassium ions and may be present in for example the form of a soluble alkali metal salt. The formation of the salt or salt-like complex may for example take place at room temperatures of from 15–35° C. whilst cooling to a temperature between 5–15° C. will generally cause precipitation of the desired compound. Obviously the exact temperatures and procedure to be used will depend upon the concentration of the reaction components and other factors and the optimum conditions must be determined by experiment in any particular case.

The purification procedure according to the invention is most convenient for application to the purification of triiodothyronine directly upon its formation by the iodination of diiodothyronine. Thus this iodination is very conveniently effected by reaction of the diiodothyronine with a solution containing one molecular proportion of iodine in an aqueous alkali metal iodide in the presence of ammonia or a suitable organic base as herein defined, conveniently at temperatures within the range 15–35° C.; mere cooling of the resultant reaction solution, provided it is of appropriate concentration will in general cause precipitation of the desired salt or salt-like complex of triiodothyronine which can be separated and further purified as desired. Whilst ammonia can be used in the actual iodination procedure, for reasons of safety it is in fact preferable to use an organic base. Ammonia can of course safely be used in the purification of crude triiodothyronine itself.

The resultant salt or salt-like complex can be recrystallised preferably from an aqueous solution containing ammonia or the appropriate organic base respectively and alkali metal ions. The triiodothyronine itself may be recovered from the salt or salt-like complex by dissolving in alkali and acidifying.

The nature of the salt of triiodothyronine which is formed in the process according to the invention is somewhat obscure. On present knowledge is appears that the ammonia or organic base is very loosely bound to the triiodothyronine molecule; the salt also appears to contain a substantial proportion of alkali-metal ions apparently derived from the alkali-metal iodide in which the iodine used in the iodination is dissolved. It should however clearly be understood that this view of the nature of the salt may be subject to modification in view of later knowledge. It is clear, however, that an exact knowledge of the nature of the triiodothyronine salt is not essential to an understanding of the invention, which, as will be appreciated, provides inter alia a simple and effective process for the simultaneous preparation and purification of triiodothyronine.

In order that the invention may be well understood the following examples are given by way of illustration only:

EXAMPLE 1

*Preparation of triiodo-L-thyronine*

Diiodo-L-thyronine (682 g.) was dissolved in ethylamine solution (6.95 l. of 33% aqueous solution) in a 20 l. 2-necked flask. The solution was stirred vigorously and 2.6 l. of N iodine solution in aqueous sodium iodide (183 g./litre) were added from a separating funnel over 1 hour. Temperature of the reaction mixture was ca. 30° C.

When all the iodine had been added the solution was cooled to 10° C. when a salt of triiodo-L-thyronine crystallised. This was filtered off through a jacketed, stainless steel filter. The filter was kept cool by circulating alcohol at 7–10° C. through the jacket.

The salt was washed by displacement with an aqueous 33% ethylamine solution (1 l.) at 10° C., sucked dry and then dried at 40° C. The yield of the salt was 775 g. diiodo-L-thyronine content <2%.

The triiodo-L-thyronine salt was dissolved in sodium hyroxide solution (6 l. of 0.5 N solution) and the solution clarified. Triiodo-L-thyronine was then precipitated by neutralising the liquors to pH 6.5 by the addition of hydrochloric acid. The precipitated triiodo-L-thyronine was filtered off and washed by slurrying with water. It was refiltered and dried at 80° in a Mitchell oven. Yield=662.5 g. Moisture content =1.9%. Yield from diiodo-L-thyronine=95.7% w./w. or 77.2% of theory.

The mother liquors and washings from the crystallisation of the salt were neutralised to pH 4.5 with hydrochloric acid to precipitate the remaining iodo-L-thyronines (117 g.).

Analysis: Loss at 105° C. 1.6%, diiodo-L-thyronine content 40%, iodine 53.7%.

EXAMPLE 2

The iodination of diiodo-L-thyronine was carried out in the manner described in Example 1 but using the bases mentioned below in place of ethylamine. The results were as follows:

| Expt. No. | Base Used | Volume of base used | Diiodo-L-thyronine, gms. | Vol. of 1 N Iodine Solution Added, ml. | Percent of Diiodo-L-thyronine on the isolated salt | Percent of Diiodo-L-thyronine when isolated as the free acid |
|---|---|---|---|---|---|---|
| 1 | Methylamine. | 70 ml. as 33% solution. | 6.8 | 26 | 1.0 | 3.0 |
| 2 | Dimethylamine. | 70 ml. as 25% solution. | 6.8 | 26 | <2.0 | 4.0 |
| 3 | Diethylamine. | 100 ml. as 20% solution. | 6.8 | 26 | 5.0 | 13.0 |
| 4 | Isopropylamine. | do | 6.8 | 26 | 6.0 | 30.0 |
| 5 | Butylamine. | do | 6.8 | 26 | <2.0 | 9.0 |

EXAMPLE 3

Crude triiodo-L-thyronine containing approximately 10% of diiodo-L-thyronine was dissolved in a dilute solution of an appropriate amine (or ammonia) and purified triiodo-L-thyronine obtained as a crystalline salt by the addition of a saturated sodium chloride solution and cooling to 7–10 C. The results are given in the table below.

| Expt. No. | Quantity of diiodo-L-thyronine and triiodo-L-thyronine mixture used, g. | Percent diiodo-L-thyronine used in the mixture | Volume of base used | Percent diiodo-L-thyronine in the salt | Total Na | Sodium as NaCl | Net Na | Theoretical value for one atom of Na |
|---|---|---|---|---|---|---|---|---|
| 6 | 10.0 | 10.0 | 40 ml. of 22% ethylamine solution. | 2.0 | 3.5 | 0.4 | 3.1 | |
| 7 | 7.7 | 9.1 | 105 ml. of 21% ethanolamine solution. | 2.0 | 3.4 | 0.1 | 3.3 | 3.4 |
| 8 | 10.0 | 10.0 | 140 ml. of 20% diethylamine solution. | 5.0 | 5.2 | 0.65 | 5.1 | |
| 9 | 10.0 | 10.0 | 220 ml. of 20% ammonia solution. | 2.0 | 5.4 | 1.0 | 4.4 | |

When potassium chloride was added in place of sodium chloride using ethylamine as the organic base as in experiment 6, the salt had the following analysis:

| | Percent |
|---|---|
| Total K | 5.7 |
| K as KCl | 0.25 |
| Net K | 5.2 |
| Theoretical potassium content | 5.6 |

We claim:

1. A process for the purification of crude triiodothyronine containing contaminating amounts of at least one compound selected from the group consisting of diiodothyronine and thyroxine, said triiodothyronine being obtained by iodinating diiodothyronine in an aqueous medium containing alkali metal ions and a basic compound selected from a group consisting of ammonia, a primary amine having a $pK_h$ greater than 7.2 and a secondary amine having a $pK_h$ greater than 7.2, whereby a complex is formed in situ by reaction of triiodothyronine as it is formed with said ions and said basic compound, which process comprises maintaining said aqueous medium at a temperature of 15–35° C. to keep said complex and said contaminating compound in solution and subsequently cooling said aqueous medium to precipitate said complex without precipitating said contaminating compound.

2. A process as claimed in claim 1 in which the basic compound is at least one amine selected from a group consisting of methylamine, ethylamine, dimethylamine, diethylamine, isopropylamine and butylamine.

3. A process as claimed in claim 1 in which the triiodothyronine is triiodo-L-thyronine.

4. A process as claimed in claim 1 in which the complex is separated by cooling the reaction medium to a temperature of from 5–15° C.

References Cited in the file of this patent

UNITED STATES PATENTS 2,784,222 Plati et al. Mar. 5, 1957
2,823,164 Pitt-Rivers et al. Feb. 11, 1958

OTHER REFERENCES

Block: Amino Acid Handbook, page 37 (1956).